United States Patent [19]

Clark et al.

[11] 3,982,077

[45] Sept. 21, 1976

[54] ASYNCHRONOUS MULTIPLEXER AND DEMULTIPLEXER COMBINATION

[75] Inventors: James Monroe Clark, Cedar Grove; Stuart Barry Cohen, Nutley; Arthur Howard Magnus, Succasunna, all of N.J.

[73] Assignee: International Telephone and Telegraph Corporation, Nutley, N.J.

[22] Filed: Apr. 7, 1975

[21] Appl. No.: 565,905

[52] U.S. Cl. ................. 179/15 BV; 179/15 BA; 179/15 AF
[51] Int. Cl.² ........................................ H04J 3/04
[58] Field of Search ......... 179/15 A, 15 BA, 15 BV, 179/15 BW, 15 BS, 15 AF

[56] References Cited
UNITED STATES PATENTS

| | | | |
|---|---|---|---|
| 3,742,145 | 6/1973 | Clark | 179/15 BA |
| 3,766,322 | 10/1973 | Moffett | 179/15 BV |
| 3,781,818 | 12/1973 | Pardoe | 179/15 BV |
| 3,809,820 | 5/1974 | Sullivan | 179/15 BA |
| 3,868,481 | 2/1975 | Patrusky | 179/15 BV |
| 3,873,773 | 3/1975 | Guy | 179/15 BA |

*Primary Examiner*—William C. Cooper
*Assistant Examiner*—Joseph A. Popek
*Attorney, Agent, or Firm*—John T. O'Halloran; Alfred C. Hill

[57] ABSTRACT

An asynchronous digital time division multiplexer and demultiplexer combination at one communication terminal is disclosed that will multiplex first N asynchronous source data signals having a first mixture of different bit rates into a transmitted synchronous data stream having a predetermined fixed data format and a given bit rate greater than the total of the bit rates of the source data and to demultiplex second N asynchronous source data signals having a second mixture of different bit rates from a received synchronous data stream having the predetermined fixed data format and the given bit rate. The combination includes an automatic channel assignment circuit to assign channels of the two data streams to the asynchronous source data signals in a manner to minimize temporary data memory regardless of the number of different bit rates by assigning the data signals to channels of the associated one of the two data streams so that the bits of each of the data signals tend to have equal spacing throughout the bits of the associated one of the two data streams. The channel assignment control circuit also includes a means to automatically indicate when the total of the mixture of bit rates has exceeded an allowable maximum.

19 Claims, 15 Drawing Figures

Fig. 6B

ASYNCHRONOUS MULTIPLEXER AND DEMULTIPLEXER COMBINATION

BACKGROUND OF THE INVENTION

This invention relates to digital time division multiplex (TDM) communication systems and more particularly to an asynchronous TDM multiplexer and demultiplexer combination employed at one communication terminal of a digital communication system.

To avoid confusion, asynchronous data input signals and output signals will be referred to herein as transmit and receive "ports", and basic time slots in a synchronous data stream format are referred to herein as "channels".

SUMMARY OF THE INVENTION

An object of the present invention is to provide an asynchronous digital TDM multiplexer and demultiplexer combination at one communication terminal of a digital communication system which provides nearly equal spacing of bits of each asynchronous data rate in a synchronous data stream for any mixture of asynchronous data rates up to a maximum total rate with a minimum of temporary storage facilities.

Another object of the present invention is to provide an asynchronous digital TDM multiplexer and demultiplexer combination at one communication terminal of a digital communication system which provides nearly equal spacing of bits of each asynchronous data rate in a synchronous data stream for any mixture of asynchronous data rates up to a maximum total rate when the required port rates are $2^n$ multiples of a basic synchronous channel rate with a minimum of temporary storage facilities.

A feature of the present invention is the provision of an asynchronous digital time division multiplexer and demultiplexer combination at one communication terminal to multiplex N asynchronous data transmit ports having a first mixture of different bit rates into a transmitted synchronous data stream having a predetermined fixed data format and a given bit rate greater than the total of the first mixture of different bit rates and to demultiplex N asynchronous data receive ports having a second mixture of different bit rates from a received synchronous data stream having the data format and the given bit rate, where N is an integer greater than one, comprising: transmitting means; N transmit circuits each coupled to a different one of the transmit N ports and in common to the transmitting means; receiving means; N receive circuits coupled in common to the receiving means and each of the N receive circuits coupled to a different one of the N receive ports; first means coupled to the transmitting means to generate a first timing code identifying transmit time slots of the transmitted data stream; second means coupled to the receiving means responsive to the received data stream to generate a second timing code identifying receive time slots of the received data stream; and third means coupled to the first and second means and each of the N transmit and receive circuits, the third means responding sequentially to the first and second timing codes to produce transmit and receive port timing signals to control distribution of bits of each of the transmit ports with equal spacing throughout the transmit time slots and to control extraction of bits of each of the receive ports from the received data stream, the bits of each of the receive port being distributed with equal spacing throughout the receive time slots, the distribution of the bits of each of the transmit and receive ports throughout the transmit and receive time slots being in agreement with its associated bit rates.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 6A:
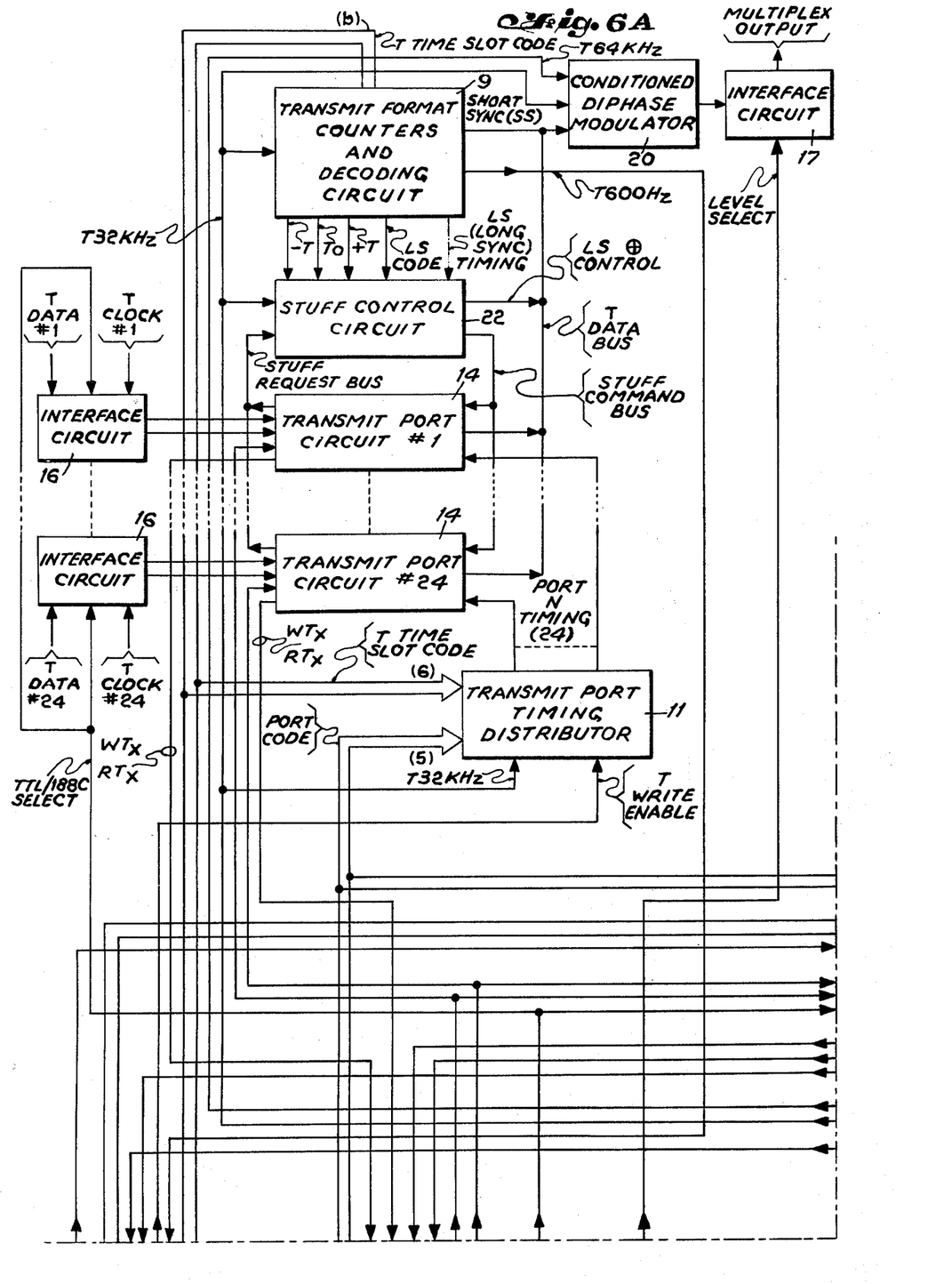
FIGS. 6A, 6B and 6C, when organized as illustrated in FIG. 6D, is a block diagram of the asynchronous digital TDM multiplexer and demultiplexer combination in accordance with the principles of the present invention.
Figure 6B:
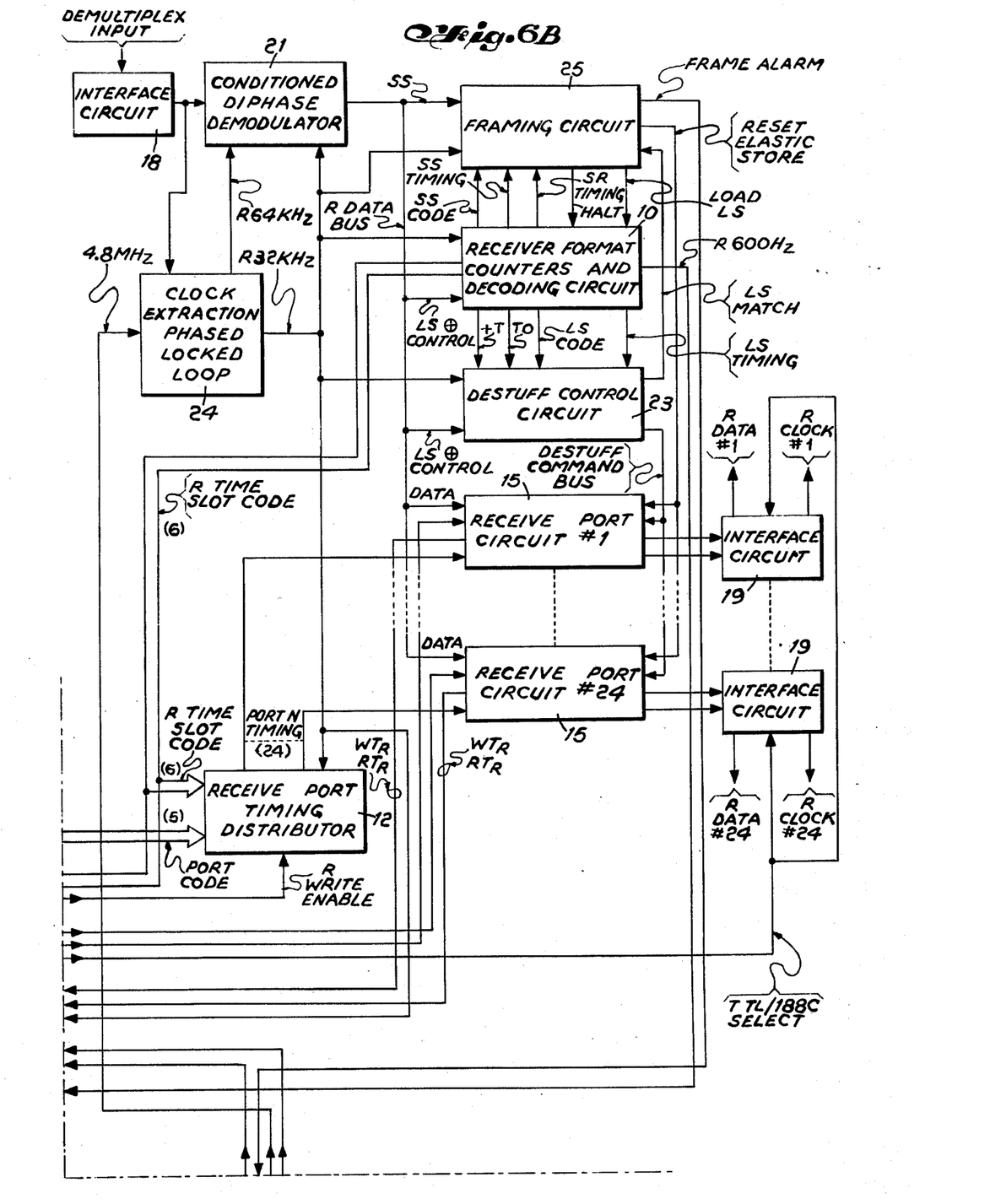
Figure 6C:
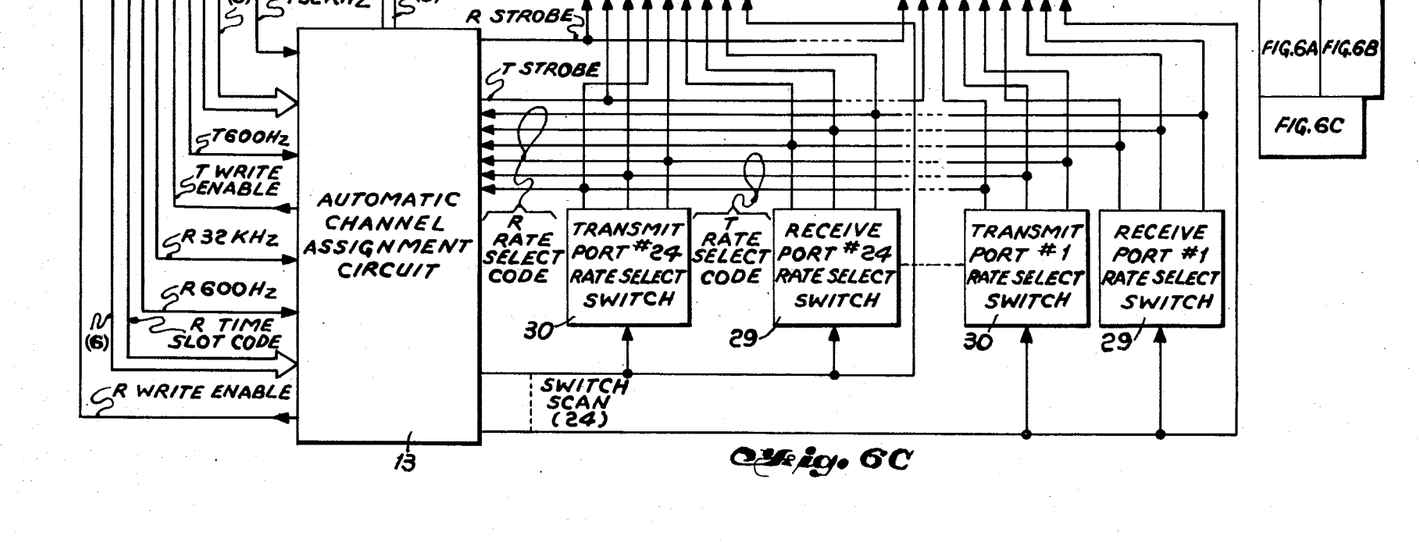

It should be noted that in the following description the multiplexer of FIG. 6A, the demultiplexer of FIG. 6B and circuits common to the multiplexer and demultiplexer of FIG. 6C are all located at a first terminal of a two-way digital communication system. Identical equipment is included in a second terminal remote from the first terminal with the two terminals being interconnected for two-way communication by an appropriate communications link. When the communication system is in operation the multiplexer of the first terminal is linked to the demultiplexer of the second terminal by the communications link and the multiplexer of the second terminal is linked to the demultiplexer of the first terminal by the communications link. The multiplexer of one terminal and the demultiplexer of the other terminal for communication in one direction must each operate on the same first mix of different bit rates with the same first channel assignments.

However, the multiplexer of said other terminal and the demultiplexer of said one terminal for communication in a direction opposite to said one direction may operate on the same second mix of different bit rates different than the first mix of different bit rates and with the same second channel assignments different than said first channel assignments. For instance, in said one direction of communication the bit rate mix may be 600, 2,400, and 1,200 BPS (bits per second) in the order named while in said other direction of communication the bit rate mix may be 600, 1,200, 4,800, and 1,200 BPS in the order named.

The following will be a description of the basic problem of providing suitable circuits permitting a mixture of rates for an asynchronous multiplexer and demultiplexer combination and the basic solution to such a problem.

Suppose three asynchronous data sources having continuous rates of 400, 200 and 100 BPS (bits per second) are to be multiplexed into a synchronous data stream format with 100 bits per second allowed for synchronization. A synchronous data stream format defining eight channels C0 – C7 of 100 BPS each as shown in FIG. 1A can be used.

Figure 1A:
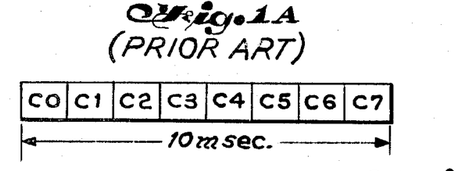
FIG. 1A illustrates a typical synchronous data stream format.

Four channels of the format of FIG. 1A can be used for the 400 BPS source S1, two channels for the 200 BPS source S2, one channel for the 100 BPS source S3 and a synchronization channel S. If consecutive channels of the format of FIG. 1A are assigned to the sources, the format shown in FIG. 1B results.

Figure 1B:
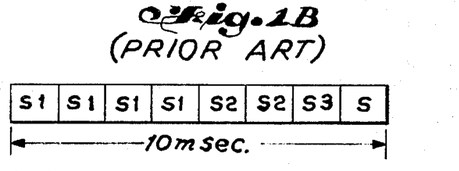
FIG. 1B illustrates a typical distribution of bits for three asynchronous data sources in the format of FIG. 1A according to prior art techniques.

The format of FIG. 1B is not good, because, for example, the source S1 bits are sent at twice the average rate during the first half of the 10 millisecond (msec.) frame, and none are sent during the second half of the frame. This requires temporary storage of bits in temporary stores 4, 5, and 6 prior to multiplexing in multiplexer 7 under control of synchronous source 8 as shown in FIG. 1C because the source rate is continuous: that is, the source bits are equally spaced.

Figures 1C, 2, 7:
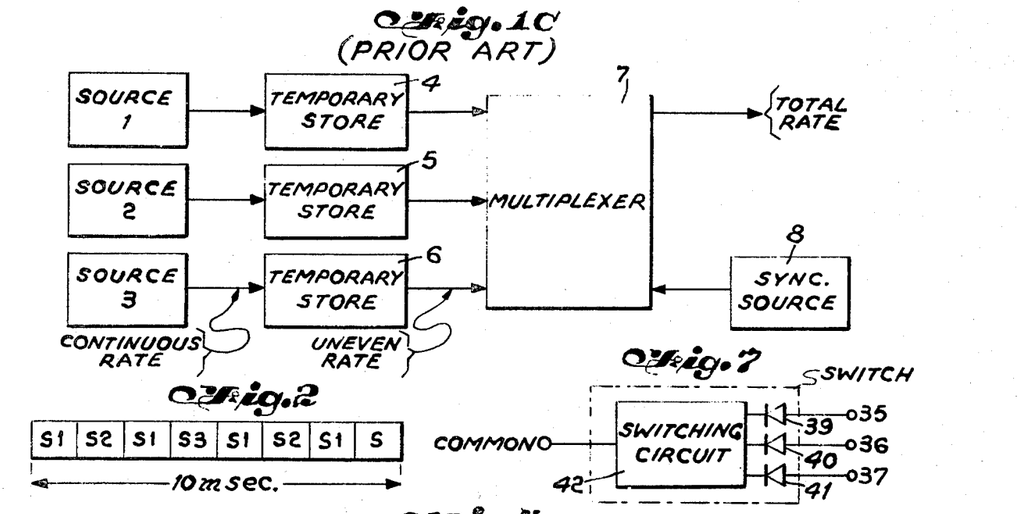
FIG. 1C is a block diagram of the circuitry necessary to distribute bits of three different asynchronous data sources in accordance with the prior art illustrated in FIG. 1B.
FIG. 2 illustrates the distribution of the bits of three asynchronous data sources in the format of FIG. 1A in accordance with the principles of the present invention.
FIG. 7 is a block diagram of one of the rate select switches of FIG. 6C.

The storage provided by temporary stores 4, 5, and 6 can be minimized by using instead the distribution of bits of the sources 1, 2, and 3 as shown in FIG. 2. In accordance with FIG. 2, for every source, the bits assigned to that source are equally spaced and, therefore, transmitted continuously.

A problem solved by the present invention is to provide a multiplexer to combine up to N asynchronous data sources into one synchronous data output channel. An asynchronous data source may have any of the data rates R, 2R, 4R, 8R . . . $2^n$R, and the output channel rate is $2^m$R. The rate kR is allowed for "overhead", that is, other functions such as synchronization, and any combination of asynchronous source rates is allowed as long as the total rate of all asynchronous sources does not exceed $(2^m-k)$R. In accordance with the principles of this invention, a general technique is provided for assigning channels of the synchronous data stream that will minimize the requirement for temporary data memory or storage regardless of the combination of asynchronous source rates. The multiplexer and demultiplexer combination of this invention automatically adapts a suitable data format according to the foregoing techniques when for each source, a switch is set to indicate the selected rate. Also, the multiplexer and demultiplexer combination of this invention provides a means to automatically indicate when the total of the selected rates has exceeded the allowable maximum rate.

Another problem solved by the subject invention is similar to the foregoing problem, but the source rates are $k_1$R, $k_2$R, $k_3$R . . . $k_N$R and the output channel rate is KR, where the constants $k_1$, $k_2$. . . $k_N$ and K are integers, but not necessarily powers of two. In this case, more temporary data storage facilities are required, but the storage facilities with respect to the prior art storage facilities can still be minimized. (Bit spacing is nearly, but not necessarily exactly, equalized.)

The same techniques discussed above are also applicable to time division switching of ports with mixed rates.

The following is a description of the principle concepts of the present invention. For purposes of illustration, the values R = 100, $n$ = 3 ($2^n$ = 8), m = 4 ($2^m$ = 16), $k$ = 1 and N = 5 will be used in the following description.

For a frame of $2^m$ = 16 bits, the bit position or time slots are conveniently numbered 0–15, and these time slots can be identified by the states of an m-bit binary counter counting from 0000 to 1111 (0 to 15 in decimal).

The channel numbers that correspond to the time slot numbers will now be defined in a way that will be shown to be very useful. For any time slot, the corresponding channel number is obtained by writing the time slot number in binary backwards, obtaining the channel number in binary notation. That is, the least significant bit of the channel number is also the most significant bit of the time slot number and vice versa. The same process can also be used to convert a channel number to a time slot number. This is illustrated in the following Table I.

TABLE I

| time slot number | | channel number | |
|---|---|---|---|
| decimal | binary | binary | decimal |
| 0 | 0000 | 0000 | 0 |
| 1 | 0001 | 1000 | 8 |
| 2 | 0010 | 0100 | 4 |
| 3 | 0011 | 1100 | 12 |
| 4 | 0100 | 0010 | 2 |
| 5 | 0101 | 1010 | 10 |
| 6 | 0110 | 0110 | 6 |
| 7 | 0111 | 1110 | 14 |
| 8 | 1000 | 0001 | 1 |
| 9 | 1001 | 1001 | 9 |
| 10 | 1010 | 0101 | 5 |
| 11 | 1011 | 1101 | 13 |
| 12 | 1100 | 0011 | 3 |
| 13 | 1101 | 1011 | 11 |
| 14 | 1110 | 0111 | 7 |
| 15 | 1111 | 1111 | 15 |

For example, time slot 11 corresponds to channel 13, and time slot 13 corresponds to channel 11.

If the channel numbers are taken in order as shown in the following Table II,

TABLE II

| channel numbers 8R port assignments: 4R port | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | ←————— A —————→ | | | | | | | | ←————— B —————→ | | | | | | | |

TABLE II-continued

Figure 3:
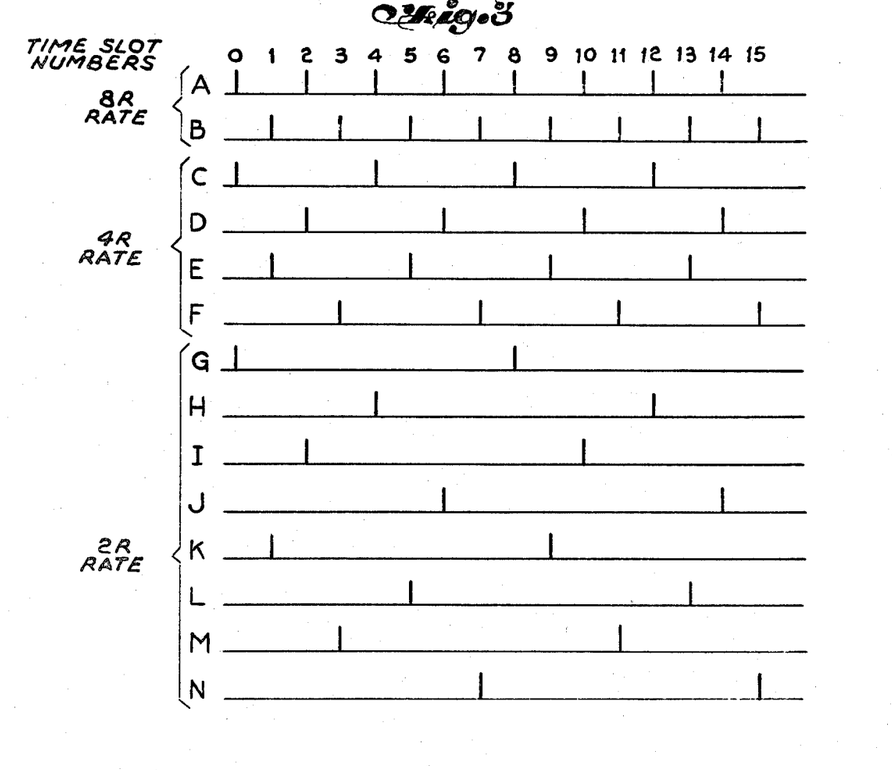
FIG. 3 illustrates a set of curves defining the synchronous data stream time slot assignment for various port rates.

| assignments: 2R port | ←——C——→ | | | | ←——D——→ | | | | ←——E——→ | | | | ←——F——→ | | | |
|---|---|---|---|---|---|---|---|---|---|---|---|---|---|---|---|---|
| assignments: R port | G | | H | | I | | J | | K | | L | | M | | N | |
| assignments: | 0 | 1 | 2 | 3 | 4 | 5 | 6 | 7 | 8 | 9 | 10 | 11 | 12 | 13 | 14 | 15 | and the channel numbers are partitioned in half, in quarters, in eighths, etc., as shown in Table II, suitable port assignments will be made. Channels 0-7 (assignment A) or channels 8-15 (assignment B) are each suitable assignments for a port requiring the rate 8R, that is, a port requiring eight channels. By reference to Tables I and II, it will be seen that assignment A includes all the even-numbered time slots and assignment B includes all the odd-numbered time slots. In each case, the time slots are equally spaced in time as shown in FIG. 3 which shows the time slot numbers in sequence.

By dividing assignment A into two parts, assignments C and D suitable for a rate of 4R are created as shown in Table II. Table II and FIG. 3 show how the assignments are repeatedly divided in half until assignments of one channel (or one time slot) per port are obtained.

To obtain suitable assignments when specific port rates are selected, such as shown in Table III,

TABLE III

| port: | 1 | 2 | 3 | 4 | 5 |
|---|---|---|---|---|---|
| rate: | R | 4R | R | 8R | R | the ports are first sorted by rates so that the higher rate ports can be assigned channels before the lower rate ports as illustrated in Table IV.

TABLE IV

| port: | 4 | 2 | (none) | 1 | 3 | 5 |
|---|---|---|---|---|---|---|
| rate: | 8R | 4R | 2R | R | R | R |

The sequence of ports 1, 3 and 5 is arbitrary because they have the same rate. The channels are then assigned in order as illustrated in table V.

TABLE V

| channel numbers: | 0 | 7 | 8 | 11 | 12 | 13 | 14 |
|---|---|---|---|---|---|---|---|
| assignment: | ←——A——→ | | ←——E——→ | | 12 | 13 | 14 |
| port: | 4 | | 2 | | 1 | 3 | 5 |
| rate: | 8R | | 4R | | R | R | R |

Channel 15 is left for overhead functions.

It may be convenient to use a binary coding of each port assignment which is compact (few bits) and easy to interpret. If an X is used to indicate a "don't care" condition, the channel numbers and time slot numbers corresponding to assignments A-N may be represented as shown in Table VI.

TABLE VI

| assignment | channel | time slot | assignment code |
|---|---|---|---|
| A | 0XXX | XXX0 | 00010 |
| B | 1XXX | XXX1 | 00011 |
| C | 00XX | XX00 | 00100 |
| D | 01XX | XX10 | 00110 |
| E | 10XX | XX01 | 00101 |
| F | 11XX | XX11 | 00111 |
| G | 000X | X000 | 01000 |
| H | 001X | X100 | 01100 |
| I | 010X | X010 | 01010 |
| J | 011X | X110 | 01110 |

TABLE VI-continued

| assignment | channel | time slot | assignment code |
|---|---|---|---|
| K | 100X | X001 | 01001 |
| L | 101X | X101 | 01101 |
| M | 110X | X011 | 01011 |
| N | 111X | X111 | 01111 |
| 0 | 0000 | 0000 | 10000 |
| 1 | 0001 | 1000 | 11000 |
| etc. | etc. | etc. | etc. |
| 15 | 1111 | 1111 | 11111 |

The time slot representation is not binary, since a digit may be either 0, 1, or X; but a binary assignment code can be formed by replacing each string of X's with an equal number of binary zeros followed by a binary 1. That is, XXX of a time slot specification is replaced by 0001; XX if a time slot specification is replaced by 001; X of a time slot specification is replaced by 01; and 1 is added at the left if no X is in a time slot specification. Assignment code 00000 can be used to indicate no assignment (idle port). Interpretation is easy, for example, code 00101 has two leading zeros, therefore, the time slot specification is XX followed by the bits 01 following the left-most "1" bit, namely, XX01. By replacing the XX by all possible binary combinations of two bits, all of the time slots belonging to this assignment can be listed as indicated in Table VII.

TABLE VII

| E | XX01 |
|---|---|
| 1 | 0001 |
| 5 | 0101 |
| 9 | 1001 |
| 13 | 1101 |

It should be noted that the time slot assignments of Table VII agree with the assignment E of FIG. 3.

Suppose the total (output) synchronous bit rate is an integer multiple of R, but not of the form $2^m R$. For example, 13R, instead of 16R as in the previous examples. In this case, the last three channels 13, 14 and 15, are deleted. These channels correspond to time slots 11, 7 and 15, which will not exist if the timing counter is made to skip counts 7, 11 and 15. This causes some format jitter, always less than one cycle, peak-to-peak, because the time slots are not perfectly equally spaced.

Suppose that the port rates are integer multiplex of R, but not of the form $2^n R$. For port rate $pR$; $p$ consecutive channel numbers can be assigned, as before. This will correspond to nearly equally-spaced time slots, but the spacing will not be perfect, leading to more jitter. Nevertheless, jitter will be minimal compared to other schemes such as in the prior art arrangements mentioned hereinabove.

In multiplexing applications, the demultiplexer must use the same assignments as the multiplexer to which it is linked. The same rate selection information must be available at both the linked multiplexer and demultiplexer either by prior arrangement, or by order-wire coordination or by sending the information on a nearly error-free control channel. Also, any arbitrary choices of assignment must be made by the same arbitrary rule by both the linked multiplexer and demultiplexer. It is convenient to assign channels to ports requiring the same rate by increasing port number and increasing channel number.

Time division switching with mixed rates is achieved by pairing a multiplexer and demultiplexer with different assignments. This is illustrated in Table VIII.

TABLE VIII

| multiplexer ports: | 4 | 2 | 6 | 1 | 3 | 7 | 5 |
|---|---|---|---|---|---|---|---|
| multiplexer channels: | 0–3 | 4–7 | 8 9 | 10 11 | 12 13 | 14 | 15 |
| demultiplexer channels: | 0–3 | 4–7 | 8 9 | 10 11 | 12 13 | 14 | 15 |
| demultiplexer ports: | 5 | 1 | 3 | 7 | 2 | 4 | 6 |

It will be noted from Table VIII that multiplexer port 4 is connected to demultiplexer port 5, etc. Thus, the channel assignments for input ports are made as described hereinabove, but each time a channel assignment A(M) is given to an input port M, give the same channel assignment A(M) to the output port C(M). But, if the rate of the switch of input port M does not match the rate of the switch of output port C(M), an alarm signal is enabled.

A combination of switching and multiplexing with mixed rates can also be achieved as is illustrated in Table IX.

TABLE IX

| multiplexer ports: | 2 | 3 | 5 | 1 | 4 | 6 |
|---|---|---|---|---|---|---|
| multiplexer channels: | 0——7 | 8 9 | 10 11 | 12 13 | 14 | 15 |
| demultiplexer channels: | 0–3 | 4–7 | 8——11 | 12 13 | 14 | 15 |
| demultiplexer ports: | 1 | 5 | 2 | 3 | 6 | 4 |

As can be seen from Table IX, multiplexer ports 3 and 5 are multiplexed into demultiplexer port 2 and multiplexer port 2 is demultiplexed into output ports 1 and 5.

The remainder of the description will be directed to an implementation of the above described port assignment technique.

Figure 4:
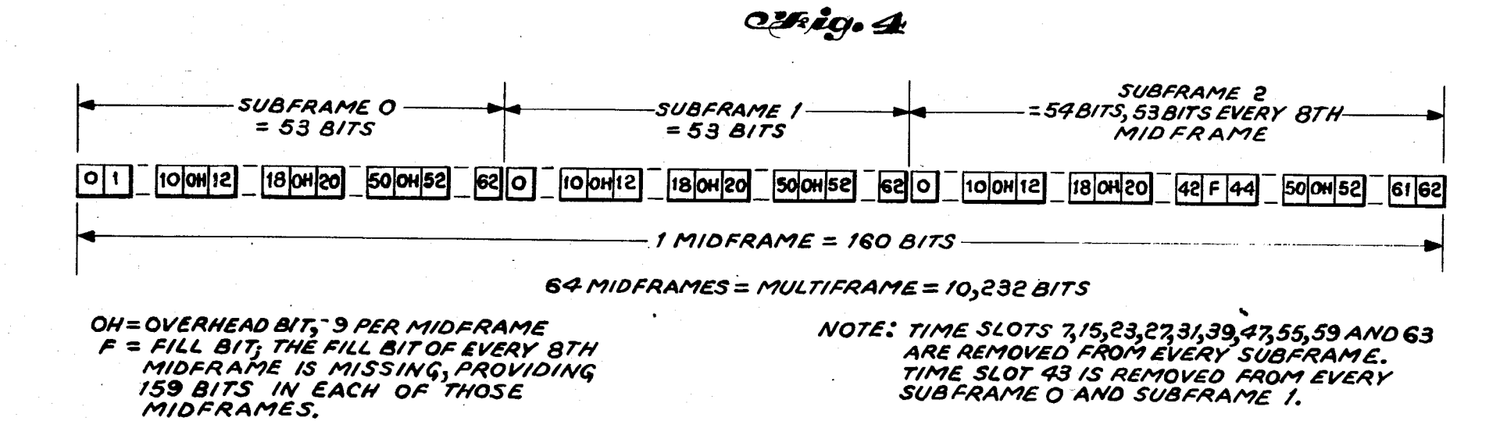
FIG. 4 illustrates a 32 KBS (kilobits per second) data format employed in the implementation of FIG. 6 in accordance with the principles of the present invention.

FIG. 4 illustrates a 32 KBS synchronous data stream format. The overhead channel occupies time slots 11, 19 and 51 of each subframe. The channel allocations of the data stream format are based on the coding of channels and time slots as shown in Table X.

TABLE X

| Time Slot LSB MSB Channel MSB LSB ABCDEF | Channel Number | Time Slot Number | |
|---|---|---|---|
| 000 0 00 | 0 | 0 | ↑ |
| 000 0 01 | 1 | 32 | |
| 000 0 10 | 2 | 16 | |
| 000 0 11 | 3 | 48 | |
| 000 1 00 | 4 | 8 | |
| 000 1 01 | 5 | 40 | |
| 000 1 10 | 6 | 24 | |
| 000 1 11 | 7 | 56 | |
| 001 0 00 | 8 | 4 | |
| 001 0 01 | 9 | 36 | |
| 001 0 10 | 10 | 20 | |
| 001 0 11 | 11 | 52 | |
| 001 1 00 | 12 | 12 | |
| 001 1 01 | 13 | 44 | |
| 001 1 10 | 14 | 28 | |
| 001 1 11 | 15 | 60 | |
| 010 0 00 | 16 | 2 | |
| 010 0 01 | 17 | 34 | |
| 010 0 10 | 18 | 18 | |
| 010 0 11 | 19 | 50 | AVAILABLE FOR DATA |
| 010 1 00 | 20 | 10 | |
| 010 1 01 | 21 | 42 | |
| 010 1 10 | 22 | 26 | |
| 010 1 11 | 23 | 58 | |
| 011 0 00 | 24 | 6 | |
| 011 0 01 | 25 | 38 | |
| 011 0 10 | 26 | 22 | |
| 011 0 11 | 27 | 54 | |
| 011 1 00 | 28 | 14 | |
| 011 1 01 | 29 | 46 | |
| 011 1 10 | 30 | 30 | |
| 011 1 11 | 31 | 62 | |
| 100 0 00 | 32 | 1 | |
| 100 0 01 | 33 | 33 | |
| 100 0 10 | 34 | 17 | |
| 100 0 11 | 35 | 49 | |
| 100 1 00 | 36 | 9 | |
| 100 1 01 | 37 | 41 | |
| 100 1 10 | 38 | 25 | |
| 100 1 11 | 39 | 57 | |
| 101 0 00 | 40 | 5 | |
| 101 0 01 | 41 | 37 | |
| 101 0 10 | 42 | 21 | |
| 101 0 11 | 43 | 53 | |
| 101 1 00 | 44 | 13 | |
| 101 1 01 | 45 | 45 | |
| 101 1 10 | 46 | 29 | |
| 101 1 11 | 47 | 61 | |

TABLE X-continued

| Time Slot LSB MSB Channel MSB LSB ABCDEF | Channel Number | Time Slot Number | | |
|---|---|---|---|---|
| 110 0 00 | 48 | 3 | | |
| 110 0 01 | 49 | 35 | | |
| 110 0 10 | 50 | 19 | | |
| 110 0 11 | 51 | 51 | OVERHEAD (3) | |
| 110 1 00 | 52 | 11 | | |
| 110 1 01 | 53 | 43 | SPARE - ⅓ | NOT USED - ⅔ |
| 110 1 10 | 54 | 27 | | |
| 110 1 11 | 55 | 59 | | |
| 111 0 00 | 56 | 7 | | |
| 111 0 01 | 57 | 39 | | |
| 111 0 10 | 58 | 23 | NOT | |
| 111 0 11 | 59 | 55 | USED (10) | |
| 111 1 00 | 60 | 15 | | |
| 111 1 01 | 61 | 47 | | |
| 111 1 10 | 62 | 31 | | |
| 111 1 11 | 63 | 63 | | |

Channel numbers 0-49 are available for assignment to 24 ports, as needed. Channels 50, 51 and 52 are permanently assigned to the overhead channel. Channel number 54-63 are not used. Channel number 53 is used only for about every third midframe, to obtain division of the 32 KBS synchronous data stream rate to the desired channel data rate. The channel numbers are made to correspond to time slots (and vice versa) by representing them in binary notation and reversing the binary numbers such that the most significant bit (MSB) of a channel number is also the least significant bit (LSB) of the corresponding time slot number, and vice versa. The time slot numbers refer to the sequence of the data in each subframe and the channel numbers refer to the sequence by which the time slots (or channels) are assigned.

There are three subframes per midframe, and 64 midframes per multiframe as shown in FIG. 4. The third subframe in each midframe has 54 bit periods, except for midframes numbered 7, 15, 23, 27, 31, 39, 47, 55, 59 and 63 (midframes are numbered 0-63). All other subframes have 53 bit periods. The subframe length is varied by skipping time slot 43 as required. This adjusts the data rate of each data channel to 600.46912 BPS.

Figure 5:
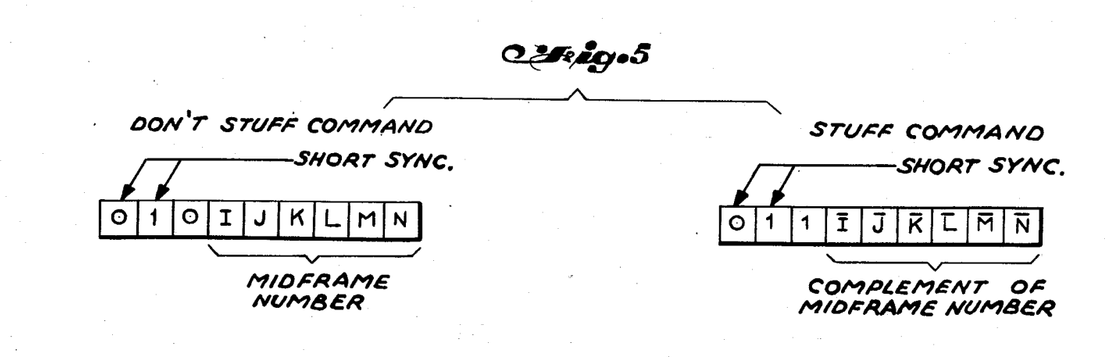
FIG. 5 illustrates the overhead format for the data format of FIG. 4.

FIG. 5 illustrates two overhead data formats. Each of these formats includes the short sync code 01 with the "don't stuff command" including the midframe number, while the "stuff command" includes the complement of the midframe number. (The midframe number is six bits in binary notation.)

The overhead data words are employed to send the short sync code and long sync code together with a stuff or don't stuff command. Complete multiframe sync is easily achieved in less than 80 msec. by combining a short sync code and a long sync code that allows multiframe sync to be obtained in much less than the multiframe period (320 msec). Three subframes, containing one overhead word, is called a midframe. A six bit counter that counts 64 midframes per multiframe is synchronized (to obtain bit count integrity) by sending the six bit count each midframe. For stuff control coding, a "1" bit is sent and the complement of the 6 bit count is sent to indicate a stuff action.

For example, consider the count 000101 (binary 5) and its complement 111010. If the port assigned to time slot five will not stuff next, then a "0" bit and the count is sent and will appear as 0000101. If the port will stuff next, then a "1" bit and complemented count is sent, namely, 1111010. To obtain the count for purposes of sync, the first bit is EXCLUSIVE-OR-ED with the next six bits, obtaining 000101, (the count) in both cases. To detect the stuff control message, correcting as many as three bit errors, the count is EXCLUSIVE-OR-ED with the last 6 bits, obtaining 0000000 in the first case, and 1111111 in the second case. A majority vote of the seven bits corrects up to three bit errors in each code. The above seven bit code is thus a combined long sync code and stuff control code. One such seven bit code and one two bit short sync code make one nine bit overhead word, one of which occupies each midframe.

Figure 6D:
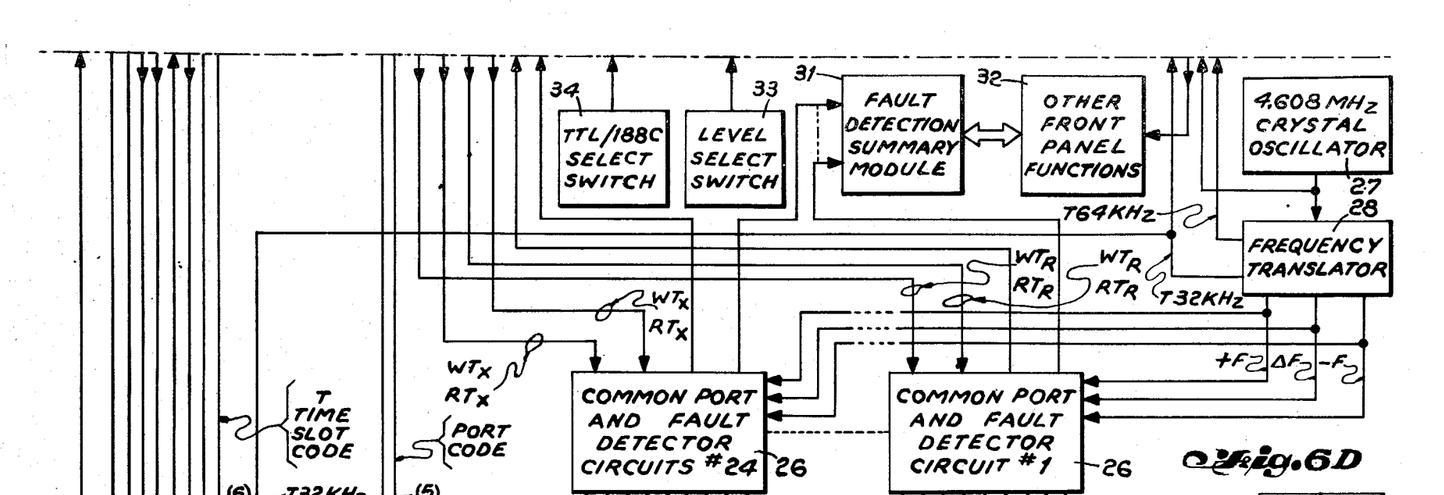

Referring to FIGS. 6A, 6B and 6C, when organized as illustrated in FIG. 6D, there is disclosed therein a block diagram of the multiplexer and demultiplexer combination to carry out the port assignment techniques discussed hereinabove. The combination has three main sections: a transmit section as shown in FIG. 6A, a receive section as shown in FIG. 6B, and circuits shared by both transmit and receive functions as shown in FIG. 6C. The transmit and receive sections each include format counters and decoding circuits 9 and 10 which generate all required timing signals according to the data format of FIGS. 4 and 5. The transmit and receive sections also include port timing distributors 11 and 12. These distributors 11 and 12 convert time slot codes to port timing pulses using assignment information obtained from the automatic channel assignment circuit 13.

The transmit and receive sections also include transmit port circuits 14 and receive port circuits 15, respectively. Port circuits 14 and 15 include mainly an elastic store and a phase locked loop circuit as will be described with respect to FIGS. 8 and 9. The interface circuits 16 and 17 of the transmit section and the interface circuit 18 and interface circuits 19 of the receive section together with the conditioned diphase modulator 20 of the transmit section and the conditioned diphase demodulator 21 of the receive section have analogous roles. The common stuff control circuit 22 of the transmit section and the common destuff control circuit 23 of the receive section communicate with the associated port circuits 14 and 15, respectively, via buses as illustrted. The receive section has two blocks more than the transmit section; namely, a clock extraction phase locked loop 24 and a framing circuit 25. Clock extraction phase locked loop 24 can be implemented as disclosed in U.S. Pat. No. 3,629,712 issued to J.M. Clark, whose disclosure is incorporated herein by reference. The framing circuit 25 and the receive and transmit format counters and decoding circuits 9 and 10 may be implemented as disclosed in U.S. Pat. No. 3,798,378 issued to M.A. Epstein, whose disclosure is incorporated herein by reference. The framing circuit 25 requires the clock extraction phase locked loop 24 to acquire clock phase (bit sync), then framing circuit 25 acquires short sync phase (data sync) and long sync phase (overhead sync) in the order named.

FIG. 6C shows all the circuitry which is shared by the transmit and receive sections of FIGS. 6A and 6B, respectively. The shared circuit includes a part of each port circuits 14 and 15 and are identified as common port and fault detector circuits 26 with circuits 26 being connected to their associated transmit port and receive port circuits 14 and 15. A 4.608 MHz (megahertz) crystal-controlled oscillator 27 is the prime source of all timing. The 4.608 MHz output of oscillator 27 is used as a reference signal for phase locked loop 24 (FIG. 6B). Frequency translator 28 generates 64 and 32 KHz (kilohertz) for the transmit timing from the output of oscillator 27 and also generates three reference frequencies +F, ΔF and −F used by the 48 digital phase locked loops contained in the forty-eight (24 transmit and 24 receive) port circuits 14 and 15. The frequencies of the reference signals are as follows: +F = 307.233 KHz, −F = 307.167 KHz and ΔF = 0.0667 KHz. Automatic channel assignment circuit 13 is shared by both transmit and receive circuits. Circuit 13 scans 48 rate select switches; namely, 24 receive rate select switches 29 and 24 transmit rate select switches 30, once every 400 msec. converting this information to assignment information which is then stored in the transmit port timing distributor 11 and receive port timing distributor 12, respectively. Common circuits 26 each include logic to store and decode the rate select codes and the port fault detection logic which is bused to the fault detection summary module 31 with the faults being displayed on the front panel along with other front panel functions as indicated by block 32. The level select switch 33 controls the level of interface circuit 17 (FIG. 6A), and the TTL/118 C select switch 34 controls interface circuits 16 and interface circuits 19 of FIGS. 6A and 6B, respectively, to provide appropriate signal levels. The abbreviation TTL refers to transistor transistor logic levels while the 188C designation refers to MIL-STD-188C (military standard 188C).

Referring to FIG. 7, there is illustrated a block diagram of a switch employed in each of the rate select switches 29 and 30. One of these switches is provided for each of the transmit ports and one of these switches is provided for each of the receive ports to select the transmit and receive rates. Each switch has eight positions, including the five standard bit rates, TTY (teletype) and two "OFF" positions. Each switch position generates a three bit code as shown in Tables XI and XII.

TABLE XI

| DIAL POSITION | MARKING | COMMON CONNECTED TO | | |
|---|---|---|---|---|
| | | 35 | 36 | 37 |
| 1 | OFF | • | | • |
| 2 | TTY | • | • | • |
| 3 | 0.6 | • | | |
| 4 | 1.2 | • | • | |
| 5 | 2.4 | • | • | |
| 6 | 4.8 | | • | • |
| 7 | 9.6 | | | • |
| 8 | OFF | • | | • |

TABLE XII

| CHANNELS PER PORT | PORT MODE SELECT CODE | SWITCH POSITION MARKING |
|---|---|---|
| 4 | 1 0 1 | 2.4 |
| 8 | 1 0 0 | 4.8 |
| X | 1 1 1 | (NOT USED) |
| 16 | 1 1 0 | 9.6 |
| 2 | 0 0 1 | 1.2 |
| 2 | 0 0 0 | TTY |
| 1 | 0 1 1 | 0.6 |
| 0 | 0 1 0 | OFF |

The coding for TTY and 1.2 BPS differs by only 1 bit, thus simplifying the logic to provide two 600 BPS channels for the TTY mode. Wiring is minimized by an arrangement whereby all switches are connected to a six-wire bus carrying transmit mode code (transmit rate select code) and a receive mode code (receive rate select code). Each output of a 1-of-24 decoder 38 (FIG. 10) is connected to the common terminals of the pair of switches corresponding to one port. The switch assembly includes integral diodes 39, 40 and 41 to provide isolation of the bus wires when the decoder 38 grounds the common terminal of the selected switch pair. A manually controlled switching circuit 42 enables selecting the rate of a particular port in accordance with the Tables XI and XII.

The bus arrangement associated with the switches 29 and 30 (Fig. 6C) is shared by the transmit and receive port circuits of FIGS. 6A and 6B, respectively (to control the phase locked loop operation in the transmit and receive port logic) and the automatic control assignment circuit 13.

Figure 8:
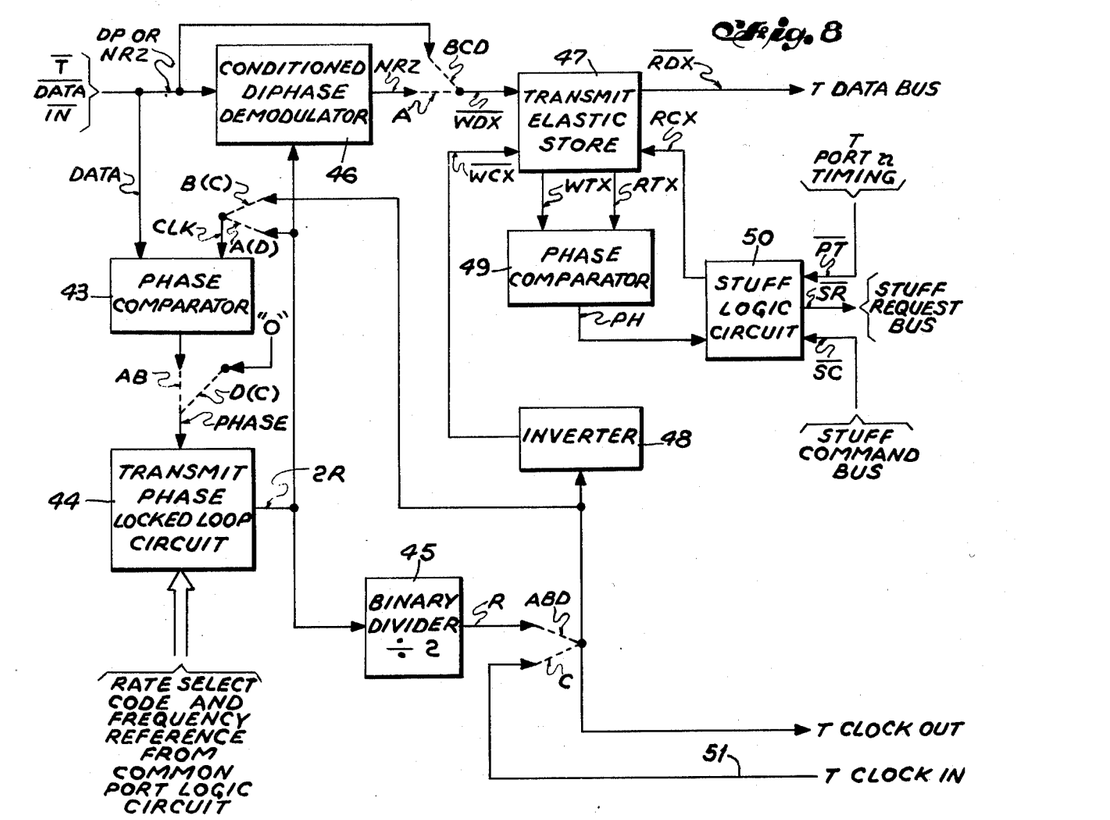
FIG. 8 is a block diagram of one of the transmit port circuits illustrated in FIG. 6A.

Referring to FIG. 8, there is disclosed therein a block diagram of a transmit port circuit 14 (FIG. 6A). Four modes, A, B, C, and D are possible by re-routing certain signals as shown by the broken lines. Mode A is used for CDP (conditioned diphase) data. Phase comparator 43 is connected to compare CDP data with the "2R" clock (twice the bit rate). The output of phase comparator 43 is connected to the transmit phase locked loop circuit 44, which selects either a high frequency reference of 307.233 KHz or a low frequency reference of 307.167 KHz according to the phase error. The selection is allowed to change whenever the high and low reference clocks are in phase which occurs at a 66.7 Hz (hertz) rate (the difference frequency). By dividing down from the nominal 307.2 KHz clock, in binary divider 45 the required bit rate is obtained. The rate select code is strobed from the transmit rate select bus and stored in latches, which control the selection of the bit rate.

The NRZ output of the CDP demodulator 46 is clocked into the transmit elastic store 47 by the extracted R (data rate) clock through inverter 48. Phase comparator 49 compares the phase of the write and read counters of elastic store 47, enabling the stuff logic 50 to generate a stuff request pulse when elastic store 47 is less than half full. When the common stuff control logic (not shown) issues a stuff command pulse, one read clock pulse is inhibited, causing one data bit in the elastic store 47 to be read twice.

Mode B is not normally used. If necessary, however, mode B could be used to extract a clock from NRZ data for which a clock signal has not been provided.

Mode C is used for NRZ data, which is caused to by-pass demodulator 46. Phase locked loop circuit 44 is not used for mode C, because the transmit clock input 51 is used as the write clock for elastic store 47. The remaining circuitry operates the same as for mode A.

Mode D is used for TTY inputs. In this case phase comparator 49 is connected in a toggle mode (toggling between + and − phase error is equivalent to zero phase error). In this mode, phase locked loop circuit 44 operates at the nominal 307.2 KHz rate. This smooth clock is employed to sample the TTY data at 1200 Hz which minimizes the increase of TTY timing distortion.

Figure 9:
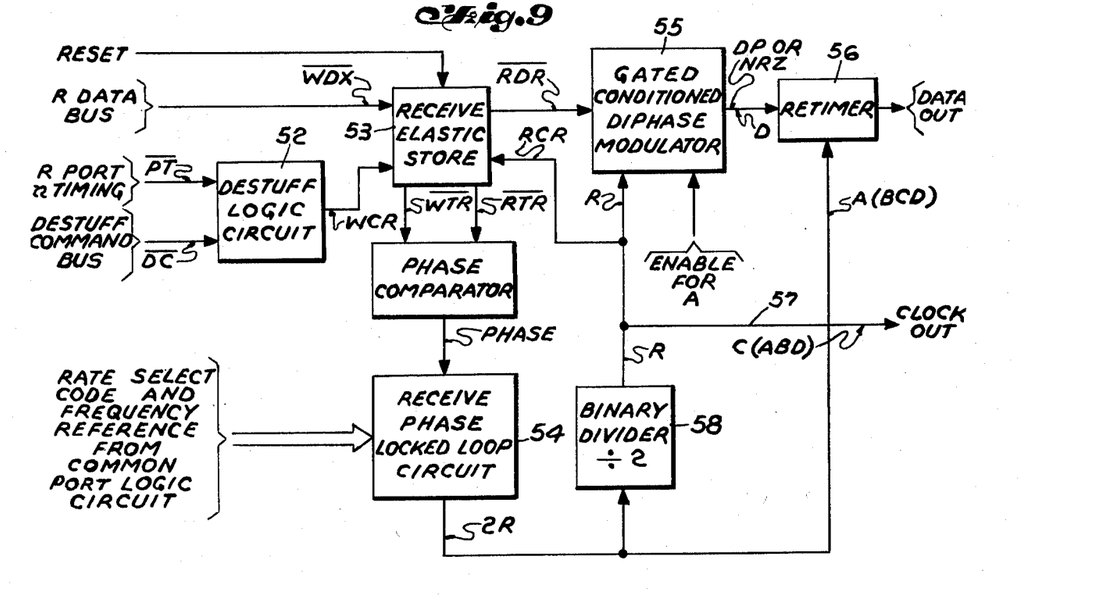
FIG. 9 is a block diagram of one of the receive port circuits of FIG. 6B.

Referring to FIG. 9, there is illustrated therein a block diagram of a receive port circuit 15 (FIG. 6B). For all modes the destuff logic circuit 52 inhibits the generation of a write clock pulse for receive elastic store 53 from a port timing pulse whenever a destuff command pulse occurs. The receive phase locked loop circuit 54 uses the same reference frequencies as transmit phase locked loop 44 (FIG. 8), although the rate selection may be different. The 3 db (decibel) jitter bandwidth of receive phase locked loop circuit 54 has been computed to be 34.5 parts per million (0.0000345) of the bit rate. There is a provision to reset receive elastic store 53 to a half-full state when the framing circuit 25 (FIG. 6B) is out of sync. When frame synchronization is acquired, all of the receive elastic stores of the receive port circuits 15 (FIG. 6B) start operating from the half-full state. The gated conditioned diphase modulator 55 is gated by the enable signal "ENABLE FOR A" to the retimer 56 and hence the data output is CDP data for mode A and NRZ data otherwise. For mode D, the NRZ data is actually a reconstruction of the TTY data. The receive clock output 57 from binary divider 58 is enabled only for mode C (NRZ data mode). Tables XIII and XIV summarize the modes discussed hereinabove with respect to FIGS. 8 and 9.

One embodiment of the logic circuit of the transmit and receive elastic store of FIGS. 8 and 9 is disclosed in the copending application of S. B. Cohen, J. M. Clark and A. H. Magnus, Ser. No. 541,558, filed Jan. 16, 1975, whose disclosure is incorporated herein by reference and one embodiment of the logic circuit of the phase locked loop and conditioned diphase modulator and demodulator of FIGS. 8 and 9 is disclosed in the copending application of S. B. Cohen, J. M. Clark and A. H. Magnus, Ser. No. 571,677, filed Apr. 25, 1975, whose disclosure is incorporated herein by reference.

Figure 10:
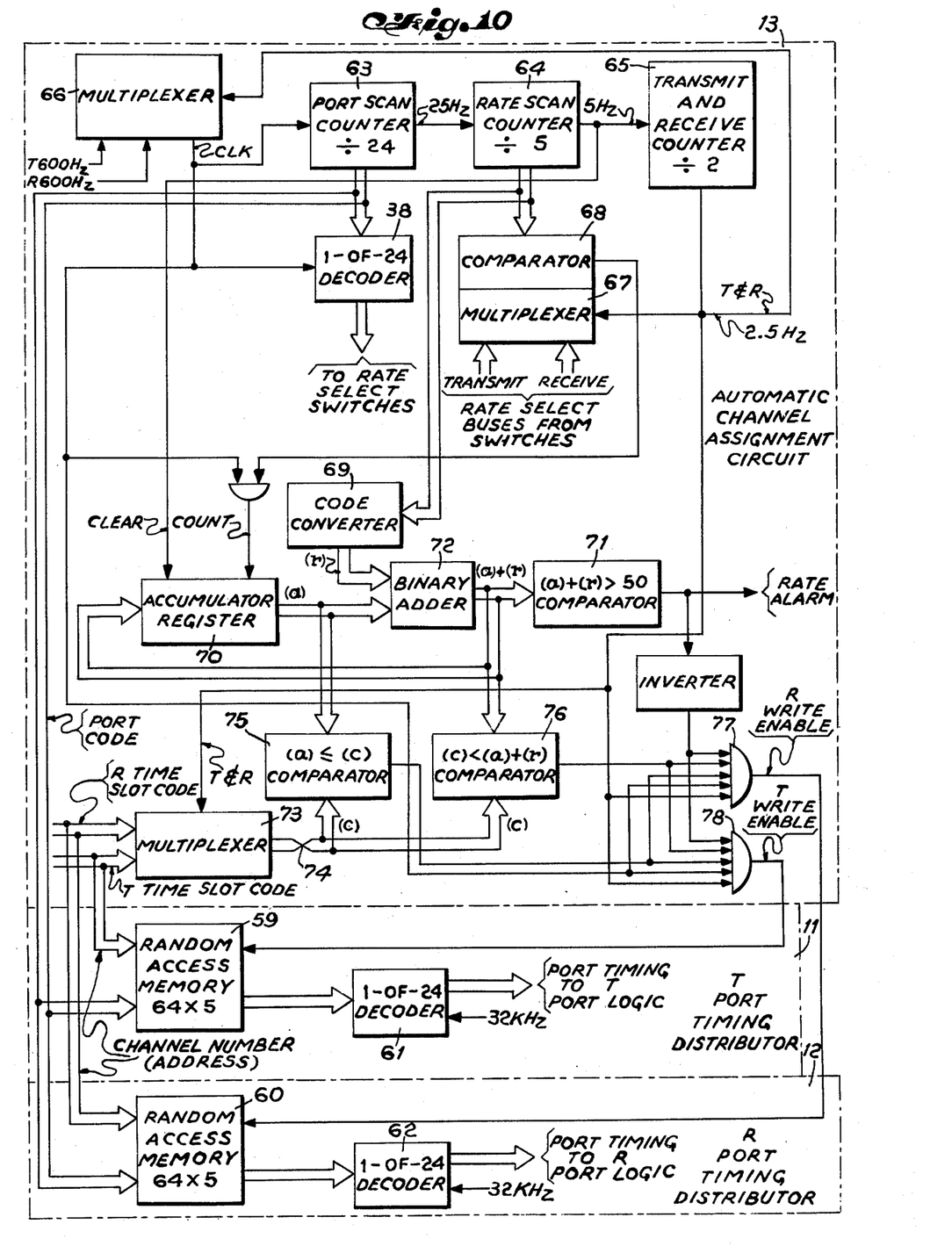
FIG. 10 is a block diagram of the automatic channel assignment circuit of FIG. 6C, the transmit port timing distributor of FIG. 6A and the receive port timing distributor of FIG. 6B.

Referring to FIG. 10, there is illustrated therein a block diagram of the automatic channel assignment circuit 13 of FIG. 6C, together with a block diagram of transmit port timing distributor 11 of FIG. 6A and a block diagram of the receive port timing distributor 12 of FIG. 6B. Distributors 11 and 12 each include a random access memory 59 and 60, respectively, that store a code identifying the port to which each time slot belongs. If a time slot has not been assigned to any port, a "blank" code is stored. Memories 59 and 60 are updated once every 400 msec. by automatic channel assignment circuit 13. For each count of the time slot counter, a time slot code addresses memories 59 and 60, and a port code is read and decoded in decoders 61 and 62, respectively, sending a pulse to the port to which that time slot has been assigned.

An alternative is to use a circulating shift register memory for memories 59 and 60, since the data is accessed sequentially, not randomly.

Automatic channel assignment circuit 13 includes a port scan counter 63, a rate scan counter 64 and a transmit-receive counter 65, counting down from a 600 Hz basic clock. Counter 65 allocates half of the counting cycle to the transmit circuits and half to the receive circuits (200 msec. each). The output of counter 65 causes the input of counter 63 to be switched from a 600 Hz transmit clock to a 600 Hz receive clock in multiplexer 66. These clocks are the outputs of the transmit and receive time slot counters of circuits 9 and 10 shown in FIGS. 6A and 6B, respectively. Since the receive and trasnmit basic clocks are not synchronous, some synchronization technique is required. A synchronization technique that can be employed is disclosed in the copending application of J. M. Clark Ser. No. 570,057, filed Apr. 21, 1975, whose disclosure is incorporated herein by reference.

In each half of the total counting cycle, counter 64 counts through five states representing the port bit rates in descending order: 9,600, 4,800, 2,400, 1,200, and 600 BPS. The coding of counter 64 is similar to the

TABLE XIII

| MODE | CODE MA | MB | | | FOR TDDM |
|------|---------|----|--|--|----------|
| A | 0 | 0 | Conditioned Diphase | Extract clock from data | Conditioned Diphase |
| B | 1 | 0 | NRZ data only | | Not used |
| C | 1 | 1 | NRZ data/clock in | | NRZ |
| D | 0 | 1 | NRZ data/clock out | | TTY |

TABLE XIV

| MODE | TTL | TTY | MA | MB |
|------|-----|-----|----|----|
| A | NO | NO | 0 | 0 |
| C | YES | NO | 1 | 1 |
| D | NO | YES | 0 | 1 | coding used for the port rate select switches as shown in Table XII, except that the "TTY" and "OFF" codes are not used. Multiplexer 67 selects the transmit or receive rate select bus as determined by the state of counter 65. The rate select code is changed to 1,200 BPS if it is TTY, (otherwise, the rate select code is not changed) and is then compared in comparator 68 with the rate code from counter 64. Matching codes indicate that the rate select switch presently scanned by counter 63 is selecting the same rate as selected by counter 64. The result of the comparison in comparator 68 is used to enable the assignment of time slots for that rate select switch. Counters 63 and 64 are arranged so that assignments are made in the following order:

all 9,600 BPS transmit ports
all 4,800 BPS transmit ports
all 2,400 BPS transmit ports
all 1,200 BPS transmit ports
all 600 BPS transmit ports
all 9,600 BPS receive ports
all 4,800 BPS receive ports
all 2,400 BPS receive ports
all 1,200 BPS receive ports
all 600 BPS receive ports where 1,200 BPS in the above list includes the TTY mode. Within each of the above listed groups, the ports are given assignments in order of the port numbers (1 to 24, coded 0 to 23 in binary code).

Code converter 69 converts the rate select code to a binary number ($r$) giving the number of channels per port according to Table XII. Accumulator register 70 is reset to zero at the beginning of each half of the total counting cycle by the 5 Hz output of counter 64. For the remainder of the half cycle, register 70 maintains a count of the total number of channels assigned thus far. At a typical point in the assignment cycle, (a) channels have been assigned; namely, channels 0 through $(a) -1$ and ($r$) more channels are to be assigned next; namely, channels ($a$) through $(a) + (r) -1$. The channels are assigned as needed from 0 through 50. If $(a) + (r)$ is greater than 50, comparator 71 enables a rate alarm. The signal $(a) + (r)$ is obtained by binary adder 72 connected to the outputs of converter 69 and register 70.

A channel (c) is among those channels to be assigned next if it satisfies the inequalities (a) $\leq$ (c) and (c)$<(a) + (r)$. Depending on which half cycle is active, the transmit or receive time slot code is gated through multiplexer 73 as shown and reversed (re-name the bits in reverse order, or reverse the wiring connection such as at 74), thus converting the time slot code to a channel code labeled (c). Comparators 75 and 76 test for the above two inequalities. If both inequalities are satisfied, and there is no rate alarm, a write enable pulse to the appropriate port timing distributor 11 or 12 is generated in AND gates 77 and 78 during the time slot corresponding to the channel being assigned. The write enable causes the port code to be written into memories 59 and 60 of the port timing distributors 11 or 12, respectively. If the assignment differs from the port code previously stored, the port code presently being read from memories 59 or 60 and being decoded in decoders 61 or 62 to produce the port timing pulses, will be replaced by a new port code. Thus, memories 59 and 60 are "slaved to", or "refreshed by" the rate information which is mechanically stored by the rate select switches 29 or 30 (FIG. 6C).

At the end of each half-cycle, less than 50 channels might be assigned (the total rate of the port may be less than 30 KBS). Although not shown on the block diagram, a pause must be generated at this point during which "blank" port codes are written into memories 59 or 60 for channels satisfying only the inequality (a) $\leq$ (c). These blank port codes include the numbers 24 through 31 in binary code which do not correspond to actual ports. The 1-of-24 decoders 61 and 62 do not produce pulses for blank port codes and since blank port codes are stored for channel numbers exceeding 50 (overhead and fill channels), no port timing pulses can be generated during the overhead or fill time slots.

While we have described above the principles of our invention in connection with specific apparatus it is to be clearly understood that this description is made only by way of example and not as a limitation to the scope of our invention as set forth in the objects thereof and in the accompanying claims.

We claim:

1. An asynchronous digital time division multiplex multiplexer and demultiplexer combination at one communication terminal to multiplex N asynchronous data transmit ports having a first mixture of different bit rates into a transmitted synchronous data stream having a predetermined fixed data format and a given bit rate greater than the total rate of said first mixture of different bit rates and to demultiplex N asynchronous data receive ports having a second mixture of different bit reates from a received synchronous data stream having said data format and said given bit rate, where N is an integer greater than one, comprising:

transmitting means coupled to a first propagation means to transmit said transmitted synchronous data stream on said first propagation means;

N transmit circuits each coupled to a different one of said N transmit ports and in common to said transmitting means;

receiving means coupled to a second propagation means to receive said received synchronous data stream from said second propagation means;

N receive circuits coupled in common to said receiving means and each of said N receive circuits coupled to a different one of said N receive ports;

first means coupled to said transmitting means to generate a first timing code identifying transmit time slots of said transmitted data stream;

second means coupled to said receiving means responsive to said received data stream to generate a second timing code identifying receive time slots of said received data stream; and third means coupled to said first and second means and each of said N transmit and receive circuits, said third means responding sequentially to said first and second timing codes to produce transmit and receive port timing signals to control distribution of bits of each of said transmit ports with equal spacing throughout said transmit time slots and to control extraction of bits of each of said receive ports from said received data stream, said bits of each of said receive ports being distributed with equal spacing throughout said receive time slots, said distribution of said bits of each of said transmit and receive ports throughout said transmit and receive time slots being in agreement with its associated bit rate.

2. A multiplexer and demultiplexer combination according to claim 1, wherein
each of said transmit circuits includes
a rate selecting switch to select an appropriate rate of operation for an associated one of said transmit circuits from among said first mixture of different bit rates.

3. A multiplexer and demultiplexer combination according to claim 2 wherein
each of said transmit circuits further includes
a phase comparator coupled to an associated one of said transmit ports and a reference clock, a phase locked loop circuit coupled to said phase comparator to produce a write clock, an elastic store coupled to said third means, said associated one of said transmit ports and said phase locked loop circuit responsive to said write clock to write bits of said associated one of said transmit ports into said elastic store, said elastic store responding to an associated one of said transmit port timing signals to read out said bits of said associated one of said transmit ports at a rate selected by said rate selecting switch to provide said equal spacing of said bits of said associated one of said transmit ports throughout said transmit time slots.

4. A multiplexer and demultiplexer combination according to claim 1, wherein each of said receive circuits includes a rate selecting switch to select an appropriate rate of operation for an associated one of said receive circuits from among said second mixture of different bit rates.

5. A multiplexer and demultiplexer combination according to claim 4, wherein each of said receive circuits further includes an elastic store coupled to said receiving means and said third means responsive to an associated one of said receive port timing signals to write bits of an associated one of said receive ports into said elastic store, a phase comparator coupled to said elastic store to compare the phase of write time and read time of said elastic store, and a phase locked loop circuit coupled to said phase comparator to generate a read clock for coupling to said elastic store to control the reading out of said bits of said associated one of said receive ports.

6. A multiplexer and demultiplexer combination according to claim 1, wherein said third means includes a first source of a transmit clock, a second source of a receive clock, a first counter to generate port codes for said transmit and receive ports, a second counter coupled in series with said first counter to generate rate codes for said transmit and receive ports, a third counter coupled in series with said second counter to define a transmit portion and a receive portion of a cycle of operation of said third means, said third counter connecting said first source to said first counter during said transmit portion and said second source to said first counter during said receive portion, a first one-of-N decoder coupled to said first and second sources, said first counter and each of said N transmit and receive circuits, said first decoder being responsive to said port codes and sequentially to said transmit and receive clocks to control each of said N transmit and receive circuits, a first multiplexer coupled to said third counter, a transmit rate bus and a receive rate bus, a first comparator coupled to said second counter and said multiplexer to compare said rate codes sequentially with a transmit rate on said transmit rate bus and a receive rate on said receive rate bus to produce a first control signal for each of said transmit portion and said receive portion, a code converter coupled to said second counter to convert each of said rate codes to a first binary number representing the number of channels per port to be assigned, said first binary number being provided in each of said transmit and receive portions, an accumulator register coupled to a selected one of said first and second sources and said first comparator, said register being responsive to said first control signal to provide in each of said transmit and receive portions a second binary number representing the number of assigned channels, a binary adder coupled to said register and said code converter to add said first and second binary numbers to provide a third binary number in each of said transmit and receive portions, said binary adder coupling said third binary number to an input of said register, a second multiplexer coupled to said first and second means and said third counter, said second multiplexer responding to said first and second timing codes to provide a fourth binary number in each of said transmit and receive portions, said fourth binary number representing the number of channels to be assigned, a second comparator coupled to said register and said second multiplexer to provide a second control signal when said second binary number is equal to or less than said fourth binary number, a third comparator coupled to said adder and said second multiplexer to provide a third control signal when said fourth binary number is less than said third binary number, a fourth comparator coupled to said adder to provide a rate alarm signal when said third binary number is greater than the maximum number of channels capable of being assigned to ports, an inverter coupled to said fourth comparator to invert said rate alarm signal, a first AND gate coupled to said inverter, said second and third comparators, said third counter and said first source to produce a transmit write enable signal in said transmit portion in response to said transmit clock, a transmit output of said third counter and said second and third control signals, and a second AND gate coupled to said inverter, said second and third comparators, said third counter and said second source to produce a receive write enable signal in said receive portion in response to said receive clock, a receive output of said third counter and said second and third control signals.

7. A multiplexer and demultiplexer combination according to claim 6, wherein said third means further includes a transmit port timing distributor coupled to said transmit circuits, said first means, said first counter and said first AND gate to provide, in response to said transmit write enable signal, said first timing code and said port codes, transmit port timing signals for said transmit circuits to assign bits of each of said transmit ports to appropriate ones of said transmit time slots of said transmitted data stream to achieve said equal spacing.

8. A multiplexer and demultiplexer combination according to claim 7, wherein
said transmit distributor includes
a first memory coupled to said first means, said first counter and said first AND gate, and
a second one-of-N decoder coupled to said first memory to provide said transmit port timing signals.

9. A multiplexer and demultiplexer combination according to claim 8, wherein
said third means further includes
a receive port timing distributor coupled to said receive circuits, said second means, said first counter and said second AND gate to provide, in response to said receive write signal, said second timing code and said port codes, receive port timing signals for said receive circuits to extracts bits of each of said receive ports from appropriate ones of said receive time slots of said received data stream, said appropriate ones of said receive time slots providing said equal spacing.

10. A multiplexer and demultiplexer combination according to claim 9, wherein
said receive distributor includes
a second memory coupled to said second means, said first counter and said second AND gate, and
a third one-of-N decoder coupled to said second memory to provide said receive port timing signals.

11. A multiplexer and demultiplexer combination according to claim 6, wherein
said third means further includes
a receive port timing distributor coupled to said receive circuits, said second means, said first counter and said second AND gate to provide, in response to said receive write signal, said second timing code and said port codes, receive port timing signals for said receive circuits to extract bits of each of said receive ports from appropriate ones of said receive time slots of said received data stream, said appropriate ones of said receive time slots providing said equal spacing.

12. A multiplexer and demultiplexer combination according to claim 11, wherein
said receive distributor includes
a memory coupled to said second means, said first counter and said second AND gate, and
a second one-of-N decoder coupled to said memory to provide said receive port timing signals.

13. A multiplexer and demultiplexer according to claim 1, wherein
each of said transmit circuits includes
a first rate selecting switch to select an appropriate rate of operation for an associated one of said transmit circuits from among said first mixture of different bit rates,
a first phase comparator coupled to an associated one of said transmit ports and a reference clock,
a transmit phase locked loop circuit coupled to said phase comparator and said first switch to produce a transmit write clock,
a transmit elastic store coupled to said third means, said associated one of said transmit ports and said transmit phase locked loop circuit responsive to said transmit write clock to write bits of said associated one of said transmit ports into said elastic store, said elastic store responding to an associated one of said transmit port timing signals to read out said bits of said associated one of said transmit ports at a rate selected by said first switch to provide said equal spacing of said bits of said associated one of said transmit ports throughout said transmit time slots; each of said receive circuits includes
a second rate selecting switch to select an appropriate rate of operation for an associated one of said receive circuits from among said second mixture of different bit rates,
a receive elastic store coupled to said receiving means and said third means responsive to an associated one of said receive port timing signals to write bits of an associated one of said receive ports into said receive elastic store,
a second phase comparator coupled to said receive elastic store to compare the phase of write time and read time of said receive elastic store, and
a receive phase locked loop coupled to said second phase comparator and said second switch to generate a read clock for coupling to said receive elastic store to control the reading out of said bits of said associated one of said receive ports; and
said third means includes
a first source of a transmit clock,
a second source of a receive clock,
a first counter to generate port codes for said transmit and receive ports,
a second counter coupled in series with said first counter to generate rate codes for said transmit and receive ports,
a third counter coupled in series with said second counter to define a transmit portion and a receive portion of a cycle of operation of said third means, said third counter connecting said first source to said first counter during said transmit portion and said second source to said first counter during said receive portion,
a first one-of-N decoder coupled to said first and second sources, said first counter and each of said first and second switches, said first decoder being responsive to said port codes and sequentially to said transmit and receive clocks to control each of said first and second switches,
a first multiplexer coupled to said third counter and said first and second switches,
a first comparator coupled to said second counter and said first multiplexer to compare said rate codes sequentially with a transmit rate from said first switches and a receive rate from said second switches to produce a first control signal for each of said transmit portion and said receive portion,
a code converter coupled to said second counter to convert each of said rate codes to a first binary number representing the number of channels per port to be assigned, said first binary number being provided in each of said transmit and receive portions,
an accumulator register coupled to a selected one of said first and second sources and said first comparator, said register being responsive to said first control signal to provide in each of said transmit and receive portions a second binary number representing the number of assigned channels, a binary adder coupled to said register and said code converter to add said first and second binary numbers to provide a third binary number in each of said transmit and receive portions, said binary adder coupling said third binary number to an input of said register, a second multiplexer coupled to said first and second means and said third counter, said second multiplexer responding to said first and second timing codes to provide a fourth binary number in each of said transmit and receive portions, said fourth binary number representing the number of channels to be assigned, a second comparator coupled to said register and said second multiplexer to provide a second control signal when said second binary number is equal to or less than said fourth binary number, a third comparator coupled to said adder and said second multiplexer to provide a third control signal when said fourth binary number is less than third binary number, a fourth comparator coupled to said adder to provide a rate alarm signal when said third binary number is greater than the maximum number of channels capable of being assigned to ports, an inverter coupled to said fourth comparator to invert said rate alarm signal, a first AND gate coupled to said inverter, said second and third comparators, said third counter and said first source to produce a transmit write enable signal in said transmit portion in response to said transmit clock, a transmit output of said third counter and said second and third control signals, and a second AND gate coupled to said inverter, said second and third comparators, said third counter and said second source to produce a receive write enable signal in said receive portion in response to said receive clock, a receive output of said third counter and said second and third control signals.

14. A multiplexer and demultiplexer combination according to claim 13, wherein
said third means further includes
a transmit port timing distributor coupled to said transmit circuits, said first means, said first counter and said first AND gate to provide, in response to said transmit write enable signal, said first timing code and said port codes, transmit port timing signals for said transmit circuits to assign bits of each of said transmit ports to appropriate ones of said transmit time slots of said transmitted data stream to achieve said equal spacing.

15. A multiplexer and demultiplexer combination according to claim 14, wherein
said transmit distributor includes
a first memory coupled to said first means, said first counter and said first AND gate, and
a second one-of-N decoder coupled to said first memory to provide said transmit port timing signals.

16. A multiplexer and demultiplexer combination according to claim 15, wherein
said third means further includes
a receive port timing distributor coupled to said receive circuits, said second means, said first counter and said second AND gate to provide, in response to said receive write signal, said second timing code and said port codes, receive port timing signals for said receive circuits to extract bits of each of said receive ports from appropriate ones of said receive time slots of said received data stream, said appropriate ones of said receive time slots providing said equal spacing.

17. A multiplexer and demultiplexer combination according to claim 16, wherein
said receive disgricutor includes
a second memory coupled to said second means, said first counter and said second AND gate, and
a third one-of-N decoder coupled to said second memory to provide said receive port timing signals.

18. A multiplexer and demultiplexer combination according to claim 13, wherein
said third means further includes
a receive port timing distributor coupled to said receive circuits, said second means, said first counter and said second AND gate to provide, in response to said receive write signal, said second timing code and said port codes, receive port timing signals for said receive circuits to extract bits of each of said receive ports from appropriate ones of said receive time slots of said received data stream, said appropriate ones of said receive time slots providing said equal spacing.

19. A multiplexer and demultiplexer combination according to claim 18, wherein
said receive distributor includes
a memory coupled to said second means, said first counter and said second AND gate, and
a second one-of-N decoder coupled to said memory to provide said receive port timing signals.

* * * * *